United States Patent [19]

Nishio et al.

[11] Patent Number: 4,905,779

[45] Date of Patent: Mar. 6, 1990

[54] OPERATION CONDITION COLLATOR AND METHODS

[75] Inventors: Katsumi Nishio, Akashi, Japan; Dale M. Cherney, Howards Grove, Wis.

[73] Assignees: Yamato Scale Company, Limited, Akashi, Japan; Hayssen Manufacturing Company, Sheboygan, Wis.

[21] Appl. No.: 56,152

[22] Filed: Jun. 1, 1987

[51] Int. Cl.⁴ .............................................. G01G 19/04
[52] U.S. Cl. .................................. 177/25.18; 364/466
[58] Field of Search .......................... 53/502, 556, 64; 177/25; 364/200 MS File, 900 MS File, 464.01, 464.02, 464.03, 466; 340/146.2

[56] References Cited

U.S. PATENT DOCUMENTS

| | | | |
|---|---|---|---|
| 3,825,085 | 7/1974 | Martin | 177/25.15 |
| 4,063,081 | 12/1977 | Handly et al. | 364/200 |
| 4,227,175 | 10/1980 | Newman | 340/146.2 |
| 4,286,325 | 8/1981 | Dlugos et al. | 364/900 |
| 4,348,744 | 9/1982 | White | 340/146.2 |
| 4,391,079 | 7/1983 | Cherney | 53/396 |
| 4,415,048 | 11/1983 | Teraoka | 177/5 |
| 4,443,860 | 4/1984 | Vidalin | 340/146.2 |
| 4,456,952 | 6/1984 | Mohrman et al. | 364/200 |
| 4,458,470 | 7/1984 | Fine | 53/502 |
| 4,494,619 | 1/1985 | Matsuno | 177/25 |
| 4,504,915 | 3/1985 | Daniels et al. | 364/900 |
| 4,516,202 | 5/1985 | Kadowaki | 364/200 |
| 4,520,883 | 6/1985 | Fukuda | 177/1 |
| 4,524,427 | 6/1985 | Vidalin et al. | 364/900 |
| 4,543,766 | 10/1985 | Boshinski | 53/64 |
| 4,548,024 | 10/1985 | Fine | 53/556 |
| 4,548,286 | 10/1985 | Sashiki et al. | 177/25 |
| 4,553,616 | 11/1985 | Haze | 177/1 |
| 4,581,738 | 4/1986 | Miller et al. | 364/200 |
| 4,622,669 | 11/1986 | Pri-Tal | 364/200 |
| 4,651,301 | 5/1987 | Ballmer et al. | 364/900 |
| 4,658,919 | 4/1987 | Nobutsugu | 177/1 |
| 4,664,200 | 5/1987 | Mikami et al. | 177/25 |
| 4,674,269 | 6/1987 | Denda | 53/556 |
| 4,694,920 | 9/1987 | Naito et al. | 177/25 |
| 4,734,676 | 3/1988 | Huon et al. | 340/146.2 |
| 4,780,830 | 10/1988 | Omi et al. | 364/478 |

Primary Examiner—Thomas M. Heckler
Attorney, Agent, or Firm—Senniger, Powers, Leavitt and Roedel

[57] ABSTRACT

Collator apparatus and methods for preventing incorrect operations of first and second machines such as a combination scale and a packaging machine which are to be used together to process the same type of product. The first machine has a first memory for storing operation condition data, each with a different data number (address), and has an associated first memory control. The second machine has a second memory for storing other operation condition data, each with a different data number, and an associated second memory control. The first memory control of the first machine is caused to generate a specified one of the data numbers of the first memory. The collator apparatus sends a request signal to the second memory control of the second machine to cause the second memory control to generate a data number of the second memory, which data number corresponds to the specified one by a predetermined relationship in the absence or malfunction. Then the data numbers so generated are compared and a starting signal is produced for the first machine when the data numbers correspond according to the predetermined relationship. The predetermined relationship, for example, can be a match, or a correspondence of data numbers in a table, or otherwise.

22 Claims, 5 Drawing Sheets

OPERATION CONDITION COLLATOR AND METHODS

FIELD OF THE INVENTION

This invention relates to a collator and methods which determine whether the operation conditions of a combination scale and of a packing machine being operated in conjunction with the combination scale correspond according to a predetermined relationship. The collator and methods are applicable to other types of machines used together as well. The invention is also described in Japanese Utility Model Application No. 59-168452 filed in Japan on Nov. 5, 1984 and laid open on May 31, 1986.

BACKGROUND OF THE INVENTION

Generally, a combination scale is an apparatus which repeatedly performs a procedure of combining into various combinations the weight signals generated by multiple weighing devices which each weigh articles, selecting from among these combinations the combination which has a total weight closest to a predetermined weight, discharging the articles from the weighing devices comprising the selected combination, and providing a new supply of articles to the emptied weighing devices. In addition, a packing machine being operated in conjunction with a combination scale is an apparatus which is used to pack the articles discharged from the combination scale into a bag or other such container. Examples of technology in this area are described for instance in U.S. Pat. Nos. 4,391,079 (packing machine control) and 4,553,616 (combination scale), and in U.S. Pat. No. 4,780,830 filed Oct. 7, 1986 (operation and display unit interfaced to both packing machine and combination scale) all of which are incorporated herein by reference.

Of course, if the type of article being supplied to the weighing devices is changed, it becomes necessary to change the operation conditions of each of the devices which constitute the combination scale, and it also becomes necessary to change the operation conditions of each of the devices which constitute the packing machine. Examples of operation conditions for a combination scale are target weight, allowable deviation from target weight, and vibration feeder amplitude and duration. Examples of operation conditions for a packing machine are bag length and rate of delivery or operation speed. The just-stated operation conditions correspond to sets of numerous values and settings (also referred to as "operation conditions") for the many devices in the combination scale and packing machine.

Changing the operation conditions requires a considerable amount of time and specialized knowledge, thus making it unduly difficult for a typical packing company to make the changes. For these reasons, it is standard practice to store for each separate type of article the operation conditions for each of the devices which constitute the combination scale in a combination scale memory which is provided in the combination scale and also store for each separate type of article the operation conditions for each of the devices which constitute the packing machine in a packing machine memory which is provided in the packing machine, and then to retrieve the new operation conditions from these two memories and supply them to the various corresponding devices each time the type of article is changed.

However, although the operation conditions sent to the combination scale and to the packing machine must both correspond to the same type of article, because the conditions are retrieved separately from the combination scale memory and from the packing machine memory, there has existed the problem of the possibility of the two not corresponding and consequent incorrect operations of the combination scale and the packing machine when used together.

SUMMARY OF INVENTION

Accordingly it is an object of the invention to provide an operation condition collator and methods which detect when operating conditions for two different machines do not correspond to the same type of article or otherwise in a useful application and to provide an operation condition collator which is versatile, effective, economical and reliable.

Generally, one form of operation condition collator of the invention includes a first memory for storing operation condition data, each with a different data number, which represent various operation conditions of a first machine, and a second memory for storing other operation condition data, each with a different data number, which represent various operation conditions of a second machine being operated in conjunction with the first machine. The collator also has first and second storage areas, and a first memory control for causing a specified one of the data numbers of the first memory to be stored in the first storage area and for reading from the first memory the operation condition data identified by said one of the data numbers. Also, the collator has a second memory control for causing the data number, which corresponds to said one of the numbers, of the second memory to be stored in the second storage area, and for reading from the second memory the other operation condition data identified by the corresponding number of the secondary memory. Further, the collator compares the data numbers stored in the first and second storage areas to determine whether or not they correspond.

In general, a method of the invention is used for operating a first machine having a first memory for storing operation condition data, each with a different data number, which represent various operation conditions of the first machine, and an associated first memory control, together with a second machine used with the first machine, having a second memory for storing other operation condition data, each with a different data number, which represent various operation conditions of the second machine, and an associated second memory control. The method includes the steps of causing the first memory control to generate a specified one of the data numbers of the first memory and sending a request signal to the second memory control of the second machine to cause the second memory control to generate a data number of the second memory, which data number corresponds to the specified one by a predetermined relationship in the absence of malfunction. Then the data numbers so generated are compared and a start enable signal is produced for the first machine when the data numbers correspond according to the predetermined relationship. The predetermined relationship, for example, can be a match, or a correspondence of data numbers in a table, or otherwise.

Other objects and features will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF PREFERRED EMBODIMENTS

Figure 1:
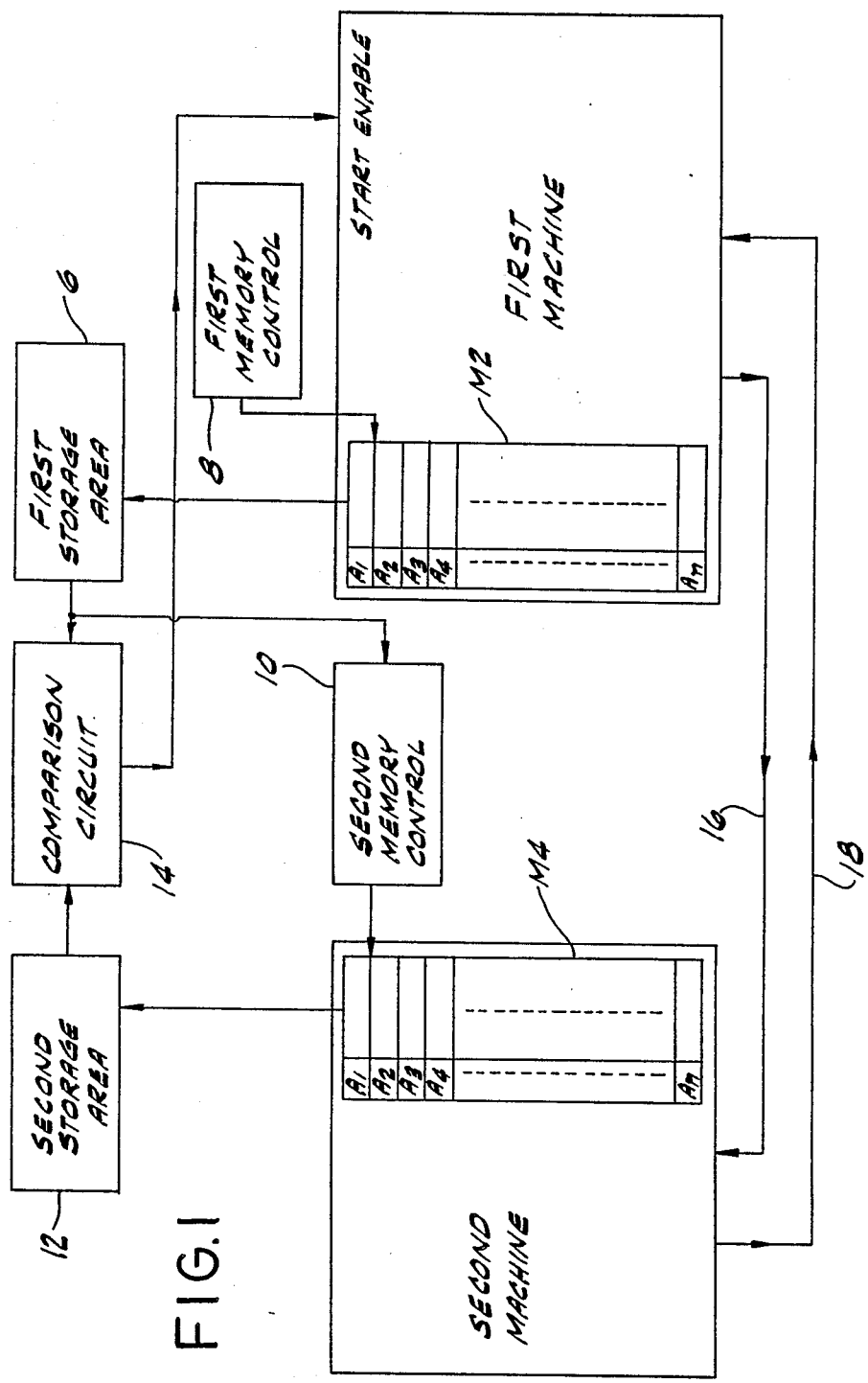
FIG. 1 is a block diagram of an operation condition collator of this invention coupled to two memories of first and second machines.

As shown in FIG. 1, a collator according to the invention has a first memory M2 for storing data, each with a different data number (or address $A_1$, $A_2$, $A_3$, $A_4$ ... $A_n$), which data represent various operation conditions of a first machine, and a second memory M4 for storing data, each with a different data number (or address), which represent various operation conditions of a second machine being operated in conjunction with the first machine. "Data numbers" refer to memory addresses where operation conditions are stored, and these numbers are illustratively just as numerous as the conditions.

The collator also includes a first memory control 8 for causing a specified one of the data numbers in the first memory M2 to be stored in a first storage area 6, and for reading from first memory M2 the data identified by said one of the numbers. A second memory control 10 causes the data number, which corresponds to said one data number, in the second memory M4 to be stored in a second storage area 12, and reads from second memory M4 the data identified by said corresponding number. A comparison circuit 14 compares the numbers stored in the first and second storage area 6 and 12 to determine whether or not they match.

The data numbers read out from the memories M2 and M4 (such as identical addresses $A_3$ and $A_3$ for one example) are stored in the storage areas 6 and 12, respectively. Then, the stored values are compared by the comparison means 14. If the values are identical, or match, the operation condition data also read out from the memories M2 and M4 correspond to each other, i.e., relate to the same article of product, and it is possible to operate the machines. A Start Enable signal is transmitted to the first machine, with which memory M2 is associated, when the values match. Some machines, such as a packing machine and combination scale, also have additional lines 16 and 18 for two-way communication thereafter as their operating cycles are executed in tandem.

In many computer systems the data numbers (addresses) are asserted by a processor or memory control on an address bus connected to memory. Stored data at each address is then produced by the memory on a separate data bus. In such systems, the phrase "data numbers read out" herein denotes addresses asserted by the processor which are sent not only via the address bus to memory but also via the address bus to another location such as storage area 6 or 12. "Operation condition data read out" denotes information stored in memory that is retrieved and produced on the separate data bus.

Figure 2:
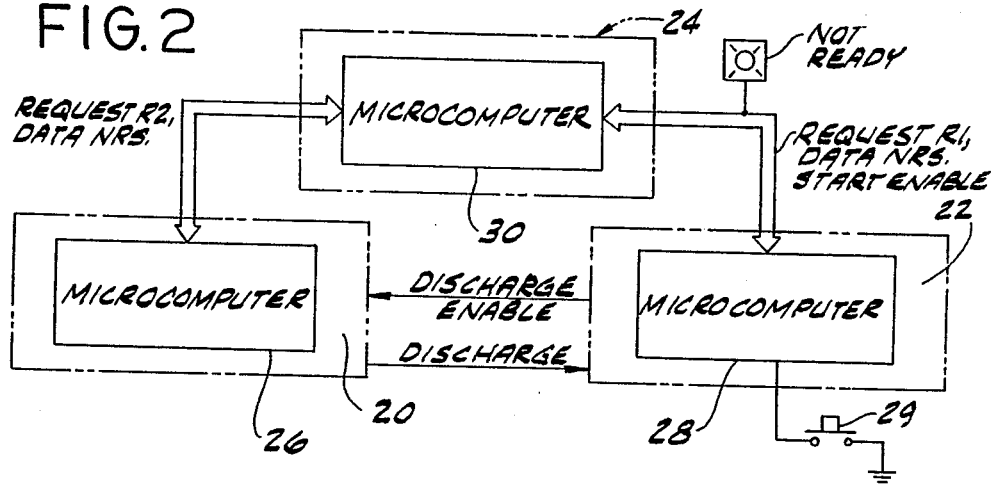
FIG. 2 is a block diagram of another embodiment of the operation condition collator of this invention having a microcomputer 30 used with respective microcomputers 26 and 28 of first and second machines.

In FIG. 2 a combination scale 20, a packing machine 22, and a collator 24 are respectively provided with a microcomputer 26, 28 and 30 according to an embodiment of the invention.

The microcomputer 26 of the combination scale 20 has a memory (M4), and a number n of different operation condition data items are stored in this memory.

In the same way, the microcomputer 28 of the packing machine 22 also has a memory (M2), and a number n of different operation condition data items are stored in this memory. These operation condition data items correspond to the n number of operation condition data items of the combination scale, and items which correspond to each other are given identical data numbers. Advantageously, the same set of data numbers, or addresses, are associated with corresponding operating conditions in two different machines.

Upon an operator depressing a start button 29, microcomputer 28 of the packing machine 22 supplies the operation condition data items having the specified data numbers (addresses) to each of the devices which constitute the packing machine 22, and also causes those data numbers themselves to be stored in the microcomputer 30 of the collator 24. Microcomputer 30 sends these data numbers to the microcomputer 26 of the combination scale 20. Microcomputer 26 (in the absence of malfunction) reads the operation condition data items having the same data numbers as those data numbers sent to it from microcomputer 30, supplies the operation condition data items so read to each of the devices which constitute the combination scale, and also causes the data numbers (addresses asserted by microcomputer 26 in the reading process) to be stored in the microcomputer 30 of the collator 24. If the data numbers sent to it from microcomputers 26 and 28 match, microcomputer 30 sends an operation enable or Start Enable signal to the microcomputer 28 of the packing machine 22. Microcomputer 30 is also advantageously programmed to alternatively recognize when the data numbers correspond according to a predetermined relationship as discussed later herein.

Figure 3:
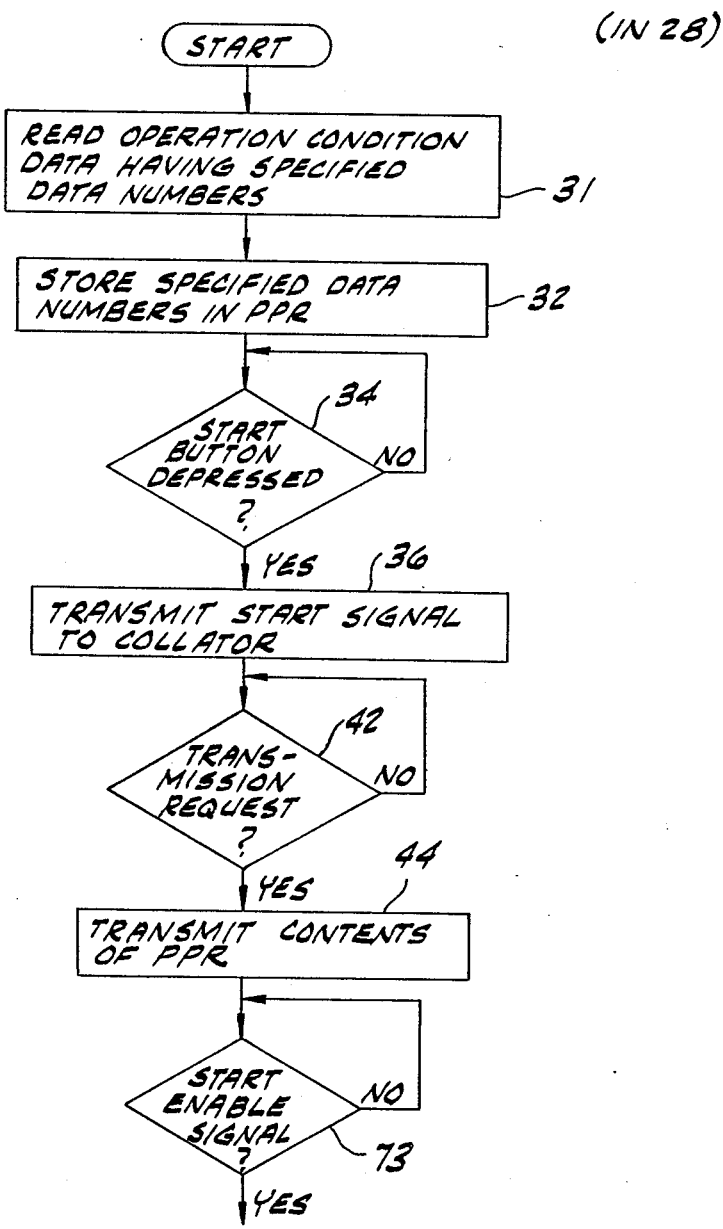
FIG. 3 is a flowchart of operations of microcomputer 28 in FIG. 2 according to a method of the invention.
Figure 4:
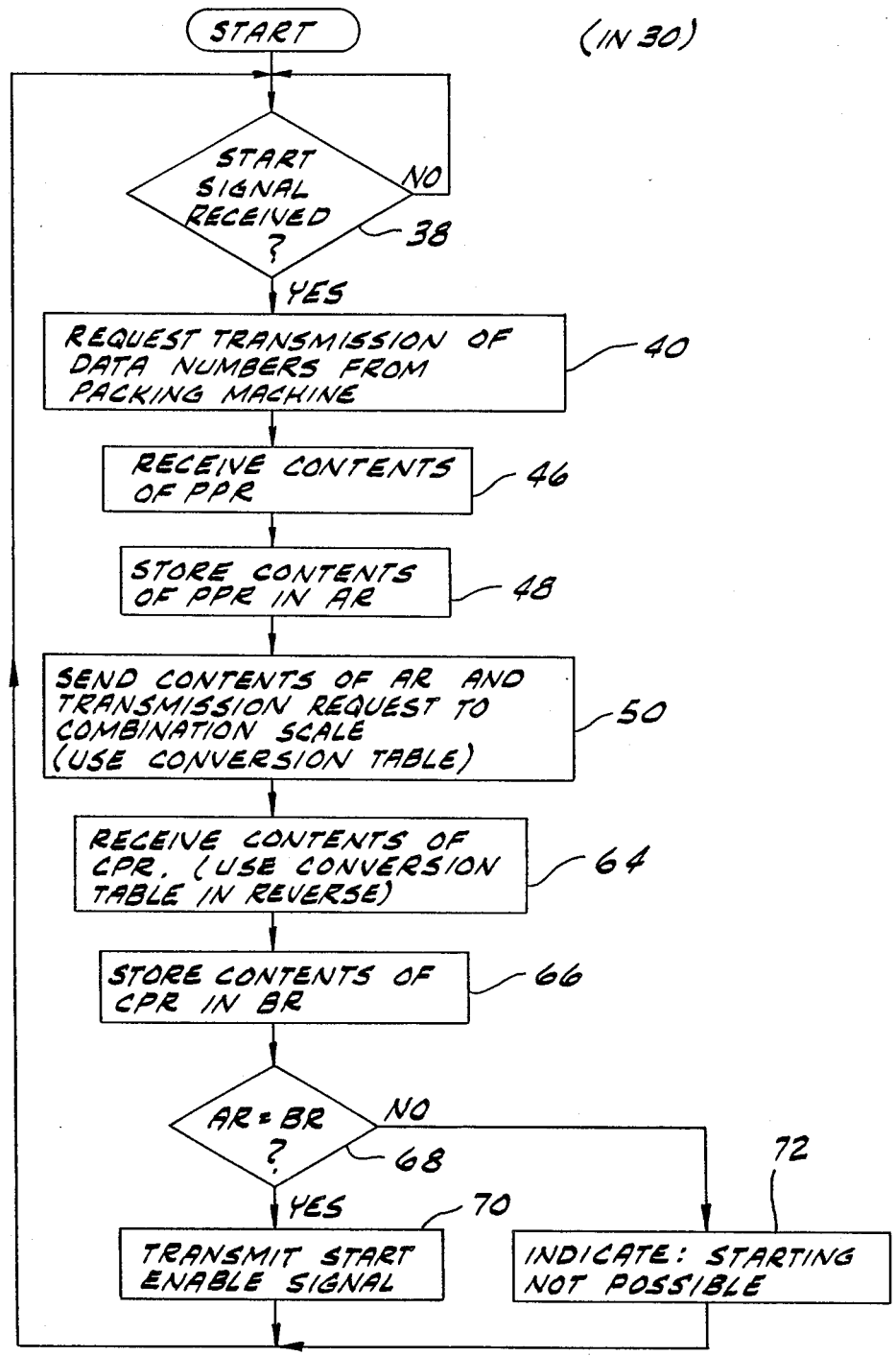
FIG. 4 is a flow chart of operations of microcomputer 30 in FIG. 2 according to a method of the invention.
Figure 5:
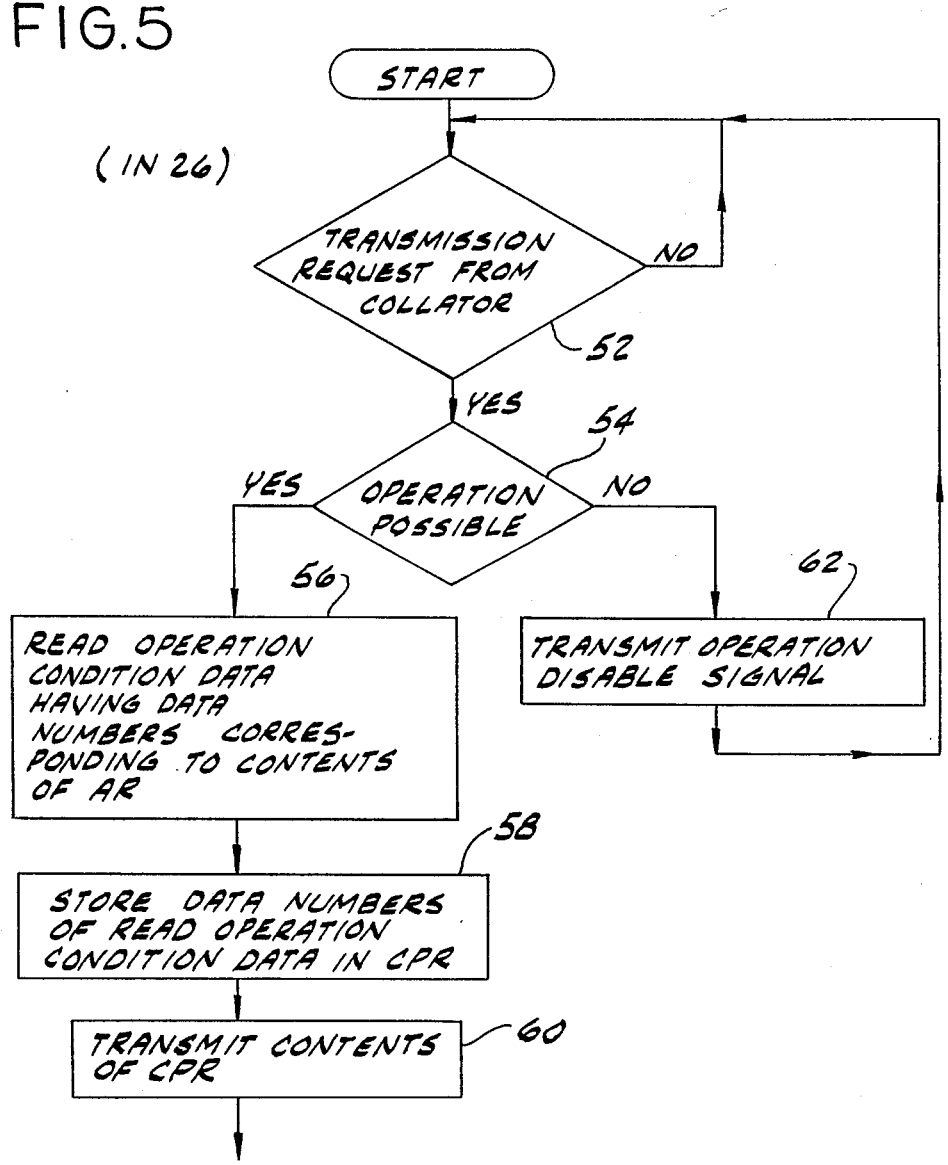
FIG. 5 is a flow chart of operations of microcomputer 26 in FIG. 2 according to a method of the invention.

The following is an explanation of the operations described above following the flowcharts shown in FIGS. 3 through 5. FIGS. 3, 4, and 5 are the flowcharts for the packing machine 22, the collator 24, and the combination scale 20 respectively.

First, the packing machine 22 reads (FIG. 3 step 31) the operation data having the data numbers specified using numerical keys for product type, etc., supplies that data to each of the devices which constitute the packing machine, and also causes the specified data numbers to be stored (step 32) in a program register PPR. The first memory control means of the first machine is thus caused to generate a specified one of the data numbers of the first memory. Next, it is determined (step 34) whether or not the start button 29 on the packing machine 22 has been pressed, and, if it has been pressed, the packing machine 22 sends (step 36) a start signal to the collator 24.

The collator 24 determines (FIG. 4 step 38) whether or not it has received the start signal, and, if it has, requests (step 40) the packing machine 22 to transmit the data numbers by sending a first request signal R1. The packing machine 22 determines (FIG. 3 step 42) whether or not it has received transmission request R2 from the collator 24, and, if it has, transmits (step 44) the contents of program register PPR to the collator 24. In this way, a specified one of the data numbers of the first memory is transmitted to a first storage means, by action of the first memory control means in response to the first request signal.

The collator 24 receives (FIG. 4 step 46) the transmitted contents of program register PPR of microcomputer 28 and stores them (step 48) in a program register AR of microcomputer 30. Then, collator 24 sends (step 50) both the contents of program register AR and a transmission request signal R2 to the combination scale 20. In this way, a second request signal is sent to the second memory control means of the second machine to cause the second memory control means to generate a data number of the second memory, which data number corresponds to said specified one by a predetermined relationship in the absence of malfunction.

In FIG. 5 the combination scale 20 determines (step 52) whether or not it has received a transmission request R2 from the collator 24, and, if it has, determines (step 54) whether or not operation is possible, meaning that the scale 20 is ready for operation. If operation is possible, the combination scale 20 reads (step 56) the operation condition data having data numbers (addresses) corresponding to the transmitted contents of program register AR, supplies that data to each of the devices which constitute the combination scale 20, stores (step 58) the data numbers (addresses) of the operation condition data just read in a program register CPR, and transmits (step 60) the contents of CPR to the collator 24. A data number of the second memory, which data number corresponds to said specified one, is thus transmitted to a second storage means, by action of the second memory control means in response to the second request signal.

It it is determined in step 54 that operation is not possible, the combination scale 20 transmits (step 62) an operation disable signal to the collator 24 and returns to step 52.

The collator 24 receives (FIG. 4 step 64) the contents of program register CPR of the combination scale and stores (step 66) those contents in a program register BR. The collator 24 then determines (step 68) whether the contents of program registers AR and BR match or not, and, if they match, transmits (step 70) a start enable signal to the packing machine 22. If it is determined in step 68 that the contents of program registers AR and BR do not match, the collator 24 indicates (step 72) that starting is not possible, such as by illuminating a "NOT READY" warning light 73 (FIG. 2) or actuating an alarm.

In this way, the data numbers of the first and second memories so generated are compared and a start enable signal for the first machine is produced when the data numbers correspond according to a predetermined relationship.

The packing machine 22 determines (FIG. 3 step 73) whether or not it has received the start enable signal. If it has, the packing machine 22 transmits a discharge enable signal (FIG. 2) to the combination scale 20 and the combination scale 20 transmits a discharge signal to the packing machine 22. In this way both units begin operation.

In the apparatus described above, the data numbers are specified by the packing machine 22 and, based on this, the combination scale 20 reads the operation condition data having the same data numbers. However, it is also possible to have the combination scale specify the data numbers and, based on that, have the packing machine 22 read the operation condition data having the same data numbers. In addition, although the packing machine executed step 34 following the execution of steps 31 and 32, it is also possible to have it execute steps 31 and 32 following the execution of step 34, and then continue and execute step 36. Other modifications in the processes described are also possible.

Figure 6:
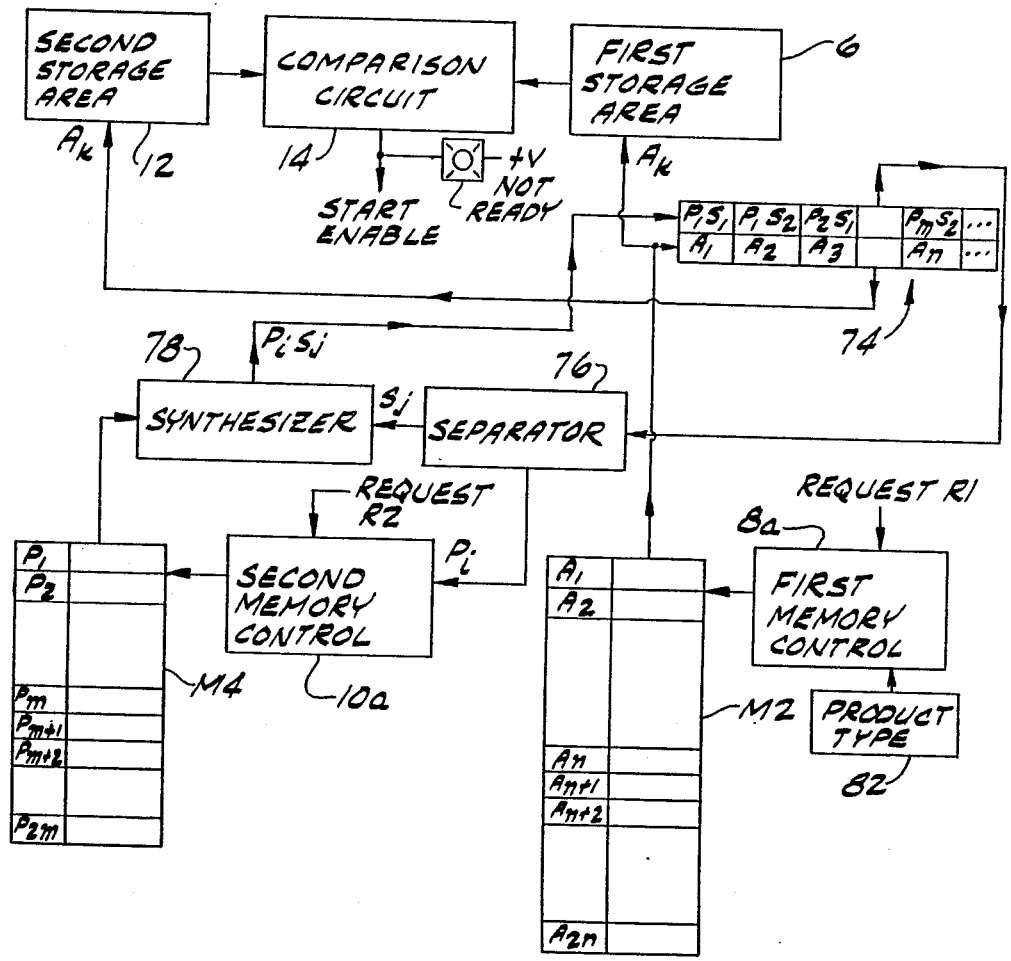
FIG. 6 is a block diagram of a further modified embodiment of the operation condition collator of this invention using a conversion table.

In the apparatus described above, the operation condition data items of the combination scale and those of the packing machine are both n in number and correspond to each other on a one-to-one relationship. However, it is also possible to have, for example, n number of packing machine operation condition data items and m number (n greater than m) of combination scale operation condition data items. In this type of situation, a conversion table 74 is provided as shown in FIG. 6. The conversion table 74 is an example of an electronic means for storing a table representing a predetermined correspondence between particular data numbers of the first memory and data numbers of the second memory so that sets of operation condition data in the first and second memories for the same article of product have their data numbers corresponding to each other in the table.

In the conversion table 74, the stored data numbers $A_1$, $A_2$ and $A_3$, for example, for the packing machine are made to correspond to the stored data numbers $P_1$, $P_1$ and $P_2$, respectively, for the scale. (Note that two packing machine memory M2 addresses $A_1$ and $A_2$ correspond in table 74 to the same address $P_1$ of scale memory M4.) The first reading means or memory control 8a reads out a data number $A_2$, for example, from the packing machine memory M2 to first storage area 6 and to table 74 as well. As a result, the scale data number $P_1$ (juxtaposed with a prestored suffix $S_2$ as described later herein) is read out from the table 74 and supplied to a data separator 76. (In general, the table 74 retrieves a prefix-suffix pair $P_iS_j$ in response to M2 address $A_k$.) The combination scale data numbers $P_i$ which correspond to the data numbers $A_k$ read from the packing machine memory M2 by the first memory control 8a are thus read from the conversion table 74 and supplied to the data separator 76.

The separator 76 separates the example number $P_1S_2$ into prefix $P_1$ and suffix $S_2$, which are respectively supplied to second memory control 10a and to a data synthesizer 78. The second memory control 10a reads out from the scale memory M4 the data number $P_1$ and supplies it to synthesizer 78. The scale data numbers $P_i$, such as example $P_1$, do not include the suffixes $S_j$, which are given in table 74 to identify the corresponding packing machine data numbers.

Unless a malfunction has occurred, the data number asserted by control 10a is identical to the prefix retrieved from table 74 which is passed to control 10a by separator 76. The synthesizer 78 synthesizes the dta number $P_i$ from the memory M4 actually asserted by control 10a and the suffix $S_j$ from the separator 76 to form and reconstitute data number $P_iS_j$, e.g. $P_1S_2$, which is returned to the table 74. Packing machine data number $A_2$, corresponding to $P_1S_2$, is thereupon successfully read out by using the conversion table in reverse and stored in the second storage area 12.

The first memory control 8a and the second memory control 10a read the operation condition data into their respective machines 22 and 20 in addition to generating the data numbers (addresses) for the collator 24. A Product Type selector 82 connected to first memory control 8a is set to select a Product X, for example. Then addresses $A_1$ to $A_n$ are read in memory M2 and addresses $P_i$ to $P_m$ are read in memory M4. If selector 82 is set to a different Product Y, then a different set of addresses $A_{n+1}$ to $A_{2n}$ are read in memory M2 and addresses $P_{m+1}$ to $P_{2m}$ are read in memory M4.

Separator 76 acts as an example of means for separating the second set of data numbers from the suffixes and supplying the data numbers so separated to the second memory control. Also, synthesizer 78 is an example of means connected to the separating means for respectively combining the data numbers actually asserted to the second memory by the second memory control with the suffixes separated from the second set of data numbers.

In the collating process, and by way of example in FIG. 6, the table 74 has read out in reverse the packing machine data number $A_2$ corresponding to the number $P_1S_2$, and supplied it to the second storage area 12. Since the data numbers ($A_2=A_2$) in the storage means 6 and 12 coincide, the comparison means 14 transmits a start enable signal to packing machine 22. In case of a malfunction, however, the collator of FIG. 6 delivers some different number to second storage area 12 than the address $A_k$ which was delivered to storage area 6, and a start enable signal is advantageously prevented because comparison circuit 14 does not detect a match. In general, there are numerous data numbers in storage areas 6 and 12, all of which must match before a start enable signal is issued by collator 24.

In this way, microcomputer 30 acts as an example of a means for sending a first request signal to the first memory control means of the first machine, the first memory control means transmitting a first set of the data numbers corresponding to a particular article of product to the first storage area. Microcomputer 30 also acts as an example of a means connected to electronic storing means (e.g. conversion table 74) for accessing the table of the electronic storing means with the first set of data numbers corresponding to the particular article to obtain a second set of data numbers of the second memory for that article of product and for sending a second request signal with the second set of data numbers to the second memory control means of the second machine. The second memory control retrieves operation condition data for the second machine from the second memory by asserting data numbers to the second memory in response to the second request signal and the second set of data numbers. Microcomputer 30 also accesses the table in reverse with the data numbers of the second memory which are actually asserted by the second memory control means, to obtain a third set of data numbers of the first memory which should be identical to the first set of data numbers in the absence of malfunction, and stores the third set of data numbers in the second storage area. Microcomputer 30 or comparison circuit 14 generates a start enable signal for the first machine only when the data numbers in said first and second storage areas match. In this way, incorrect machine operation is prevented when the operation condition data retrieved for the second machine do not correspond to the same article of product as the operation condition data for that article in the first machine.

The conversion table 74 is also optionally implemented in step 50 of FIG. 4 and used in reverse in step 64 to accomplish the inventive operations and methods of the apparatus of FIG. 6 correspondingly in the microcomputer-based system of FIG. 2. Step 50 thus includes a step of preestablishing a table representing a predetermined correspondence between particular data numbers of the first memory and data numbers of the second memory so that sets of operation condition data in the first and second machines for the same article of product have their data numbers corresponding to each other in the table. The table is accessed with the set of data numbers corresponding to the particular article to obtain a second set of data numbers of the second memory for that article of product, and a second request signal is sent with the second set of data numbers to the second memory control of the second machine. Then in step 64 the table is accessed in reverse with the data numbers actually asserted, to obtain a third set of data numbers of the first memory which should be identical to the first set of data numbers in the absence of malfunction, and the third set of data numbers is stored in a second storage means such as register BR in step 66.

When suffixes are used, the table is accessed in step 50 with first memory data numbers to obtain the second set of data numbers of the second memory with suffixes appended thereto. Then the second set of data numbers are separated by software from the suffixes and the data numbers so separated are supplied to the second memory control means. In step 64 the data numbers actually asserted to the second memory by the second memory control means are respectively combined by software with the suffixes separated from the second set of data numbers. The table is then accessed in reverse with the data numbers so combined to obtain the third set of data numbers for storage in register BR in step 66 and comparison with the first data numbers in step 68.

If the number n of packing machine operation condition data items is less than the number m of combination scale operation condition data items (m greater than n) the connections or roles of the memories M2 and M4 are advantageously interchanged in FIG. 6 to accommodate.

The use of prefixes involves duplicating one or more of the M4 memory addresses and then tagging the duplicates with suffixes to artificially create a set of data numbers for table 74 that are just as numerous as the data numbers $A_1$, $A_2$, $A_3$ ... $A_n$ of memory M2. As an example, assume n=6 and m=3. The duplications can be made as follows to produce the following prefixes in a set of six—($P_1$, $P_1$, $P_1$, $P_1$, $P_2$, $P_3$). For simplicity, let the set of prefixes be represented by the prefix subscripts: (1, 1, 1, 1, 2, 3). Suffixes are illustratively added as juxtaposed digits: (10, 11, 12, 13, 20, 30) In other words, each duplicated prefix (1) is illustratively followed respectively by a suffix 0, 1, 2, 3. Other sets of prefixes such as (1, 1, 2, 2, 3, 3) or (1, 1, 2, 3, 3, 3) or numerous other choices can also be used with appropriate suffixes added. The skilled worker selects one of the alternative sets of prefixes, or programs a computer to do so, and adds suffixes to the duplicated prefixes in a manner that is efficient of memory and decoding hardware and/or software implementing the table.

As indicated above, table 74 holds some entries which have the same prefix (or address of memory M4) but different suffixes. The use of suffixes advantageously permits the operation of table 74 in reverse. In other words, when the same address $P_i$ of memory M4 corresponds to more than one address $A_k$ in memory M2, the use of different suffixes $S_j$ appended to the same prefix $P_i$ permits use of table 74 to determine which of the addresses $A_k$ of memory M2 must have originally called for the memory M4 address $P_i$ in each instance.

Table 74 advantageously accomplishes at least two important functions. First, the addresses (data numbers) for a given set of packing machine operation conditions are made to correspond with different addresses in the combination scale memory M4. In other words, different sets of addresses in each machine are automatically associated with the same article. This feature is useful even when the number of packing machine addresses n is the same as the number of scale addresses m (m=n) because of the addresses for operation conditions originally assigned for the same article in each machine will in general be different for different manufacturers or even for two machines of the same manufacturer unless there is coordination or standardization. In a second important function of table 74, the addresses (data numbers) in a first machine are also made to correspond with a different number of addresses in a second machine (n greater or less than m) by the use of suffixes appended to duplicates of the less numerous addresses. In this way, the collator and methods are sufficiently versatile to satisfy a variety of practical application requirements.

In a still futher embodiment, table 74 is interposed in the line between memory M2 of FIG. 1 and first storage area 6. Associated with table 74 is a latch, a register or other additional storage area (not shown) for the memory M2 data numbers. Duplicates of some of the memory M4 addresses (data numbers) are stored in table 74 (like the prefixes of FIG. 6 but without the suffixes). In this way, memory M4 addresses $P_i$ are compared with each other and will match in the absence of malfunction.

The data numbers of the operation condition data read from the combination scale memory M4 and the data numbers of the operation condition data read from the packing machine memory M2 are thus compared by a comparison circuit 14, either directly as in FIGS. 1 and 2, or indirectly with the aid of a conversion table 74 as in FIG. 6. In this way, the invention prevents operation of the combination scale and the packing machine under incorrect operation conditions.

It is to be noted that depending on the requirements of any given application the inventive apparatus and methods are embodied and performed entirely in hardware, in hardware with firmware components, or in a computer programmed with appropriate software.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A collator comprising a first memory for storing operation condition data accessible by data numbers, each of the operation condition data being accessible by a different data number, the operation condition data representing various operation conditions of a first machine, and a second memory for storing other operation condition data accessible by data numbers, each being accessible by a different data number, said other operation condition data representing various operation conditions of a second machine operated in conjunction with said first machine, first and second storage means, first memory control means for causing a particular one of the data numbers of said first memory to be stored in said first storage means, and for reading from said first memory the operation condition data identified by said particular one of the data numbers, second memory control means, responsive to said first storage means, for causing a data number, which corresponds to said particular one of the data numbers stored in said first storage means, of said second memory to be stored in said second storage means, and for reading from said second memory the other operation condition data identified by said data number of said second memory which corresponds to said particular one of said data numbers of said first memory, and comparison means for comparing the data numbers stored in said first and second storage means to determine whether or not they correspond, and means for supplying a start enable signal to said first machine when the numbers stored in said first and second storage means match.

2. A collator according to claim 1, wherein said first machine is a combination scale, and said second machine is a packing machine.

3. A collator according to claim 1, wherein said first machine is a packing machine, and said second machine is a combination scale.

4. A collator for enabling operation of a first machine to be operated in conjunction with a second machine, the first machine having a first memory control means and a first memory for storing sets of operation condition data which sets correspond to different articles of product of the first machine, each of the operation condition data in each set having a different data number, and the second machine having a second memory control means and a second memory for storing sets of other operation condition data having data numbers which sets correspond to the articles of product for the second machine, the collator comprising:

electronic means for storing a table representing a predetermined correspondence between particular data numbers of the first memory and data numbers of the second memory so that the sets of operation condition data in the first and second memories for a given article of product have their data numbers corresponding to each other in the table;

first and second storage means;

means for sending a first request signal to the first memory control means of the first machine, the first memory control means transmitting to said first storage means a first set of the data numbers of the first memory corresponding to a particular article of product;

said means for sending the first request signal including means for accessing the table of the electronic storing means with the first set of data numbers corresponding to the particular article to obtain a second set of data numbers for that article of product and for sending a second request signal with the second set of data numbers to the second memory control means of the second machine, the second memory control means retrieving operation condition data for the second machine from the second memory by providing data numbers corresponding to the second set of data numbers to the second memory in response to the second request signal and the second set of data numbers;

said accessing means including means for accessing the table with the data numbers of said second memory which are provided by the second memory control means, to obtain a third set of data numbers, and for storing the third set of data numbers in the second storage means;

means for comparing the data numbers in the first and second storage means; and means for generating a start enable signal for at least one of the machines only when the data numbers in said first and second storage means match, whereby machine operation is enabled when the operation condition data retrieved for the second machine correspond to an article of product which is the same as an article to which the operation condition data correspond in the first machine.

5. A collator as claimed in claim 4 wherein the data numbers of the second memory for a particular article are less numerous than the data numbers of the first memory for the particular article and the predetermined correspondence represented by the table in said electronic means for the data numbers of the first memory comprises a correspondence to at least one duplicated data number of the second memory with a suffix appended thereto.

6. A collator as claimed in claim 5 wherein said means for accessing includes means for separating the suffix from the second set of data numbers and supplying the data numbers thus separated to the second memory control means, and means connected to the separating means for combining the data numbers asserted to the second memory by the second memory control means respectively with each suffix separated from the second set of data numbers, the means for accessing the table utilizing the data numbers thus combined to obtain the third set of data numbers.

7. A collator according to claim 4, wherein said first machine is a combination scale, and said second machine is a packing machine.

8. A collator according to claim 4, wherein said first machine is a packing machine, and said second machine is a combination scale.

9. A method of operating a first machine having a first memory for storing operation condition data, each of the operation condition data being accessible by a different data number, the operation condition data representing various operation conditions of the first machine, and associated first memory control means, and of operating a second machine in conjunction with the first machine, the second machine having a second memory for storing other operation condition data each with a different data number, said other operation condition data representing various operation conditions of the second machine, and associated second memory control means, the method comprising the steps of:

causing the first memory control means to generate a particular one of the data numbers of said first memory;

sending a request signal to the second memory control means of the second machine to cause the second memory control means to generate a data number of the second memory; and comparing the data numbers of the first and second memories thus generated; and producing a start enable signal for the first machine when the data numbers generated correspond according to the predetermined relationship.

10. A method according to claim 9, wherein the predetermined relationship is that the data numbers match.

11. A method according to claim 9, wherein the method further comprises the step of prestoring a table of entries of corresponding data numbers of the first and second memories to define the predetermined relationship and the comparing step includes comparing the the data numbers generated to the entries in the table.

12. A method according to claim 9 further comprising the steps of sending the data number of the first memory thus generated to a first storage means and sending the corresponding data number of the second memory thus generated to a second storage means, wherein the comparing step includes comparing the data numbers in the first and second storage means.

13. A method according to claim 9, wherein said first machine is a combination scale, and said second machine is a packing machine.

14. A method according to claim 9, wherein said first machine is a packing machine, and said second machine is a combination scale.

15. A method of enabling operation of a first machine to be operated in conjunction with a second machine, the first machine having a first memory for storing operation condition data, each accessible by a different data number, which represent various operation conditions of the first machine, and first memory control means connected to the first memory, and the second machine having a second memory for storing other operation condition data, each accessible by a different data number, which represent various operation conditions of the second machine, and second memory control means connected to the second memory, the method comprising the steps of:

sending a first request signal to the first memory control means of the first machine;

transmitting a particular one of the data numbers of said first memory to a first storage means, by operating the first memory control means in response to said first request signal;

sending a second request signal corresponding to the particular one of the data numbers transmitted to the first storage means to the second memory control means of the second machine;

transmitting a data number of said second memory, which data number corresponds to said particular one, to a second storage means, by operating the second memory control means in response to the second request signal;

comparing the data numbers transmitted to said first and second storage means; and generating a start enable signal for the first machine when said comparing step indicates that the data numbers transmitted to said first and second storage means match.

16. A method as claimed in claim 15, wherein said first machine is a combination scale, and said second machine is a packing machine.

17. A method as claimed in claim 15, wherein said first machine is a packing machine, and said second machine is a combination scale.

18. A method of enabling operation of a first machine to be operated in conjunction with a second machine, the first machine having a first memory for storing sets of operation condition data which sets correspond to different articles of product of the first machine, each of the operation condition data in each set having a different data number, and first memory control means connected to the first memory and the second machine having a second memory for storing sets of other operation condition data having data numbers which sets correspond to the articles of product for the second machine, and second memory control means connected to the second memory, the method comprising the steps of:

preestablishing a table representing a predetermined correspondence between particular data numbers of the first memory and data numbers of the second meory so that sets of operation conditions data in the first and second machines for a given article of product have their data numbers corresponding to each other in table;

sending a first request signal to the first memory control means of the first machine;

transmitting a set of the data numbers corresponding to a particular article of product to a first storage means, by operating the first memory control means in response to the first request signal;

accessing the table with the set of data numbers corresponding to the particular article to obtain a second set of data numbers of the second memory for the particular article of product;

sending a second request signal with the second set of data numbers to the second memory control means of the second machine;

operating the second memory control means to retrieve operation condition data for the second machine from the second memory by asserting the second set of data numbers to the second memory in response to the second request signal;

accessing the table with the data numbers of said second memory asserted, to obtain a third set of data numbers of the first memory which third set is identical to the first set of data numbers in the absence of malfunction, and storing the third set of data numbers in a second storage means; comparing the data numbers in the first and second storage means; and generating a start enable signal for the first machine when the data numbers in said first and second storage means match, so that machine operation of the first and second machines together is enabled when the operation condition data retrieved for the second machine correspond to an article of product which is the same as an article to which the operation condition data correspond in the first machine.

19. A method as claimed in claim 18 wherein the the data numbers of the second memory for the particular article are less numerous than the data numbers of the first memory for the particular article and the preestablishing step includes duplicating at least one of the data numbers of the second memory and appending suffixes thereto to represent the predetermined correspondence of data numbers for the first and second machines.

20. A method as claimed in claim 18 wherein the first accessing step includes accessing the table with first memory data numbers to obtain the second set of data numbers of the second memory with suffixes appended thereto, separating the second set of data numbers from the suffixes and supplying the second set of data numbers thus separated to the second memory control means, and the second accessing step includes combining the data numbers asserted to the second memory by the second memory control means respectively with the suffixes separated from the second set of data numbers and accessing the table with the data numbers thus combined to obtain the third set of data numbers.

21. A method as claimed in claim 18, wherein said first machine is a combination scale, and said second machine is a packing machine.

22. A method as claimed in claim 18, wherein said first machine is a packing machine, and said second machine is a combination scale.

* * * * *